United States Patent
Moses et al.

(10) Patent No.: US 9,446,512 B1
(45) Date of Patent: Sep. 20, 2016

(54) IANT SWARM ROBOTIC PLATFORM AND EVOLUTIONARY ALGORITHMS

(71) Applicants: Melanie E. Moses, Albuquerque, NM (US); Joshua P. Hecker, Albuquerque, NM (US); Kenneth Letendre, Albuquerque, NM (US); Karl Andrew Stolleis, Santa Fe, NM (US)

(72) Inventors: Melanie E. Moses, Albuquerque, NM (US); Joshua P. Hecker, Albuquerque, NM (US); Kenneth Letendre, Albuquerque, NM (US); Karl Andrew Stolleis, Santa Fe, NM (US)

(73) Assignee: STC.UNM, Albuquerque, NM (US)

(*) Notice: Subject to any disclaimer, the term of this patent is extended or adjusted under 35 U.S.C. 154(b) by 9 days.

(21) Appl. No.: 14/668,741

(22) Filed: Mar. 25, 2015

Related U.S. Application Data

(60) Provisional application No. 61/970,805, filed on Mar. 26, 2014.

(51) Int. Cl.
*G05B 19/418* (2006.01)
*B25J 9/00* (2006.01)

(52) U.S. Cl.
CPC .................... *B25J 9/0084* (2013.01)

(58) Field of Classification Search
CPC .. G06N 3/008; B62D 57/032; G05D 1/0274; G05D 1/0246; G05D 1/0255; G05D 1/0242; B25J 9/161; B25J 9/1664; B25J 9/1671; B25J 9/1679; B25J 9/0084; B25J 13/085; B25J 9/1697; B25J 19/023; B25J 9/1692; G05B 2219/40479; G05B 2219/45092; G05B 19/41825; G05B 2219/33125; G05B 2219/33337; G05B 2219/45083; G05B 2219/37572; G06F 3/0614; G01N 35/0099; G01N 1/312; A61B 19/22; A61B 19/5212
USPC ....... 700/245, 246, 247, 249, 250, 253, 255, 700/258, 259; 318/568.11, 568.12, 568.16
See application file for complete search history.

(56) References Cited

U.S. PATENT DOCUMENTS

| | | | |
|---|---|---|---|
| 6,636,847 B1 * | 10/2003 | Spires | G06F 17/30241 707/770 |
| 6,904,335 B2 * | 6/2005 | Solomon | G05D 1/0088 318/568.11 |
| 7,343,222 B2 * | 3/2008 | Solomon | G05D 1/0088 318/568.11 |
| 7,363,124 B1 * | 4/2008 | Duarte | F41H 7/005 701/23 |

(Continued)

OTHER PUBLICATIONS

Karl A. Stolleis,The Ant and the Trap: Evolution of Ant-Inspired Obstacle Avoidance in a Multi-Agent Robotic System, May 2015, University of New Mexico, Thesis Submitted in Partial Fulfillment of the Requirements for the Degree of Master of Science Computer Science, pp. 1-68.*

(Continued)

*Primary Examiner* — Jaime Figueroa
(74) *Attorney, Agent, or Firm* — Keith A. Vogt; Vogt IP

(57) ABSTRACT

The present invention provides a swarm of robots and a related method of operating the swarm. The robots are programmed to start at a nest and to select a dispersal direction from a uniform random distribution. The robots travel along the dispersal direction until transitioning to a search mode upon reaching a search site, where the robot performs a correlated random walk with fixed step size and direction and using a standard deviation to determine how correlated the direction of the next step of the robot is with the direction of the previous step. If no resource is found within predetermined time t independently determined by each of said robots, the robot returns to the nest and repeats the above steps.

20 Claims, 14 Drawing Sheets

(56) References Cited

U.S. PATENT DOCUMENTS

| | | | |
|---|---|---|---|
| 8,112,374 B2* | 2/2012 | Van Dyke Parunak | G06F 17/30705 706/14 |
| 9,207,667 B2* | 12/2015 | Chen | G05B 19/41865 |
| 2004/0030449 A1* | 2/2004 | Solomon | B64C 39/024 700/245 |
| 2004/0162638 A1* | 8/2004 | Solomon | G05D 1/0088 700/247 |
| 2005/0251291 A1* | 11/2005 | Solomon | G05D 1/0088 700/245 |
| 2006/0161405 A1* | 7/2006 | Munirajan | G06N 3/008 703/6 |
| 2008/0027591 A1* | 1/2008 | Lenser | G05D 1/0251 701/2 |
| 2009/0164638 A1* | 6/2009 | Jang | H04W 72/10 709/226 |
| 2010/0286824 A1* | 11/2010 | Solomon | G05D 1/0088 700/248 |
| 2014/0309774 A1* | 10/2014 | Chen | G05B 19/41865 700/248 |
| 2014/0365258 A1* | 12/2014 | Vestal | G06Q 10/063114 705/7.15 |

OTHER PUBLICATIONS

Joshua P. Hecker et al., Beyond pheromones: evolving error-tolerant, flexible, and scalable ant-inspired robot swarms, Feb. 2015, Springer, Swarm Intelligence (2015), vol. 9, issue 1, pp. 43-70.*

Vignesh Kumar et al., A Swarm intelligence based approach to the mine detection problem, 2002, IEEE, Rochester Institute of Technology RIT Scholar Works, pp. 1-7.*

Vignesh Munirajan, A swarm intelligence based approach to the mine detection problem, 2004, Rochester Institute of Technology RIT Scholar Works, pp. 1-96.*

* cited by examiner

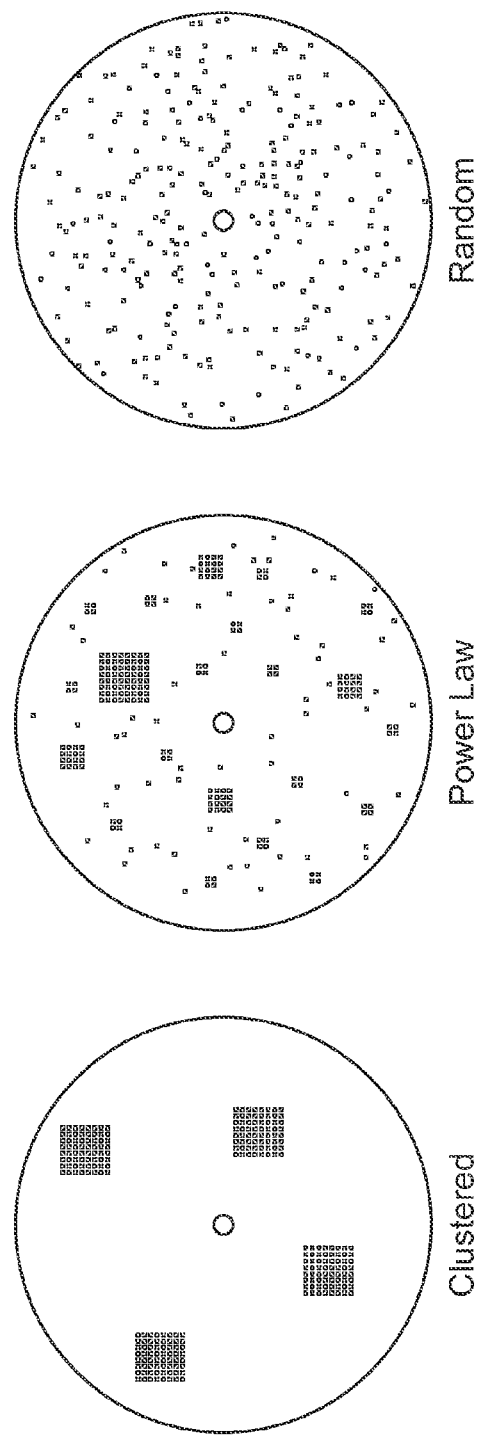

FIG. 4A Clustered
FIG. 4B Power Law
FIG. 4C Random 256 resources are placed in one of three distributions: (Fig. 4A) the clustered distribution has four piles of 64 resources. (Fig. 4B) The power law distribution uses piles of varying size and number: one large pile of 64 resources, 4 medium piles of 16 resources, 16 small piles of 4 resources, and 64 randomly placed resources. (Fig. 4C) The random distribution has each resource placed at a uniform random location.

Best and mean fitness, measured as foraging efficiency (resources collected per hour, per swarm) for simulated swarms foraging on (Fig. 5A) clustered, (Fig. 5B) power law, and (Fig. 5C) random resource distributions with and without real-world sensor error. Results are for 100 replicates.

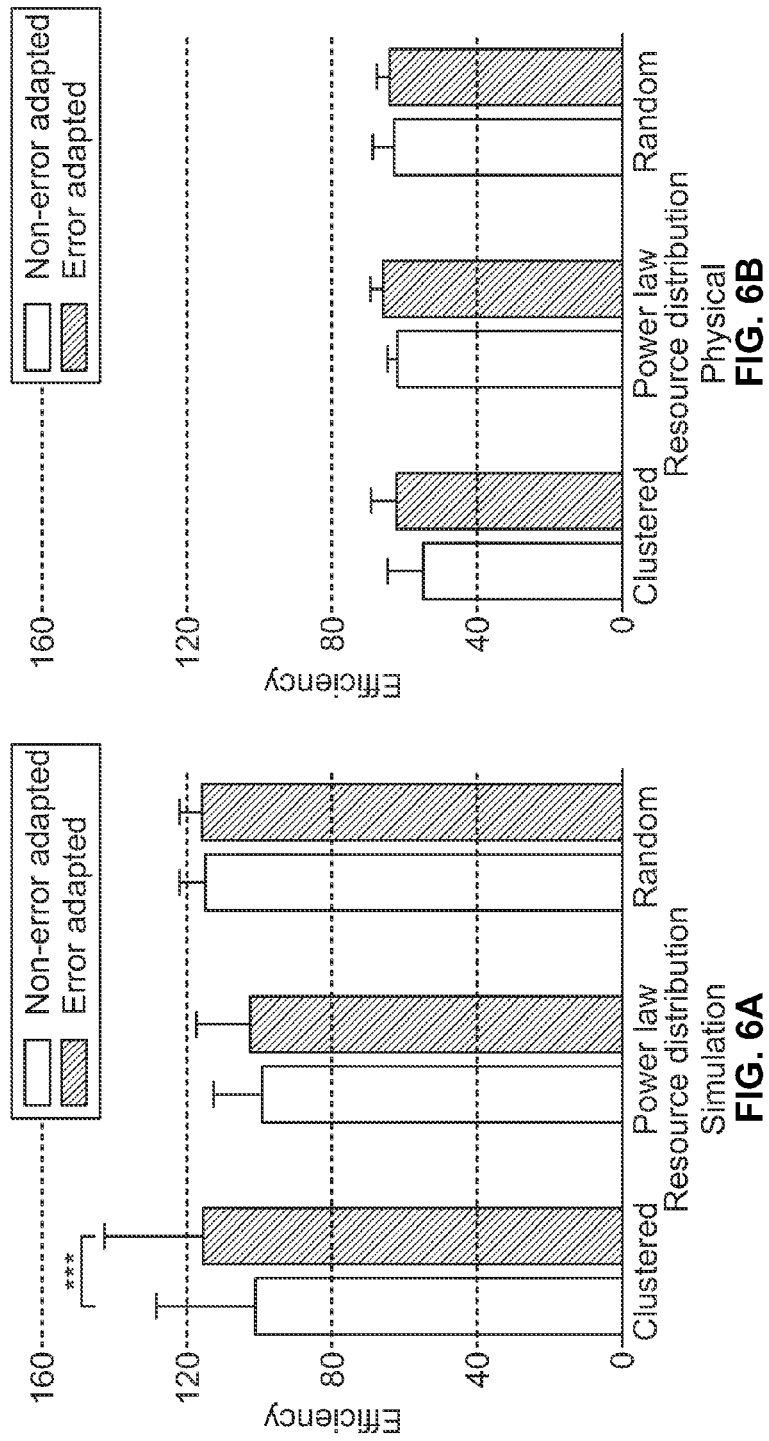
Foraging efficiency (resources collected per hours, per swarm) using error-adapted and non-error-adapted parameters for (Fig. 6A) 6 robots foraging in a simulation that includes sensor error and (Fig. 6B) 6 physical robots. Asterisks indicate a statistically significant difference ($p < .001$).

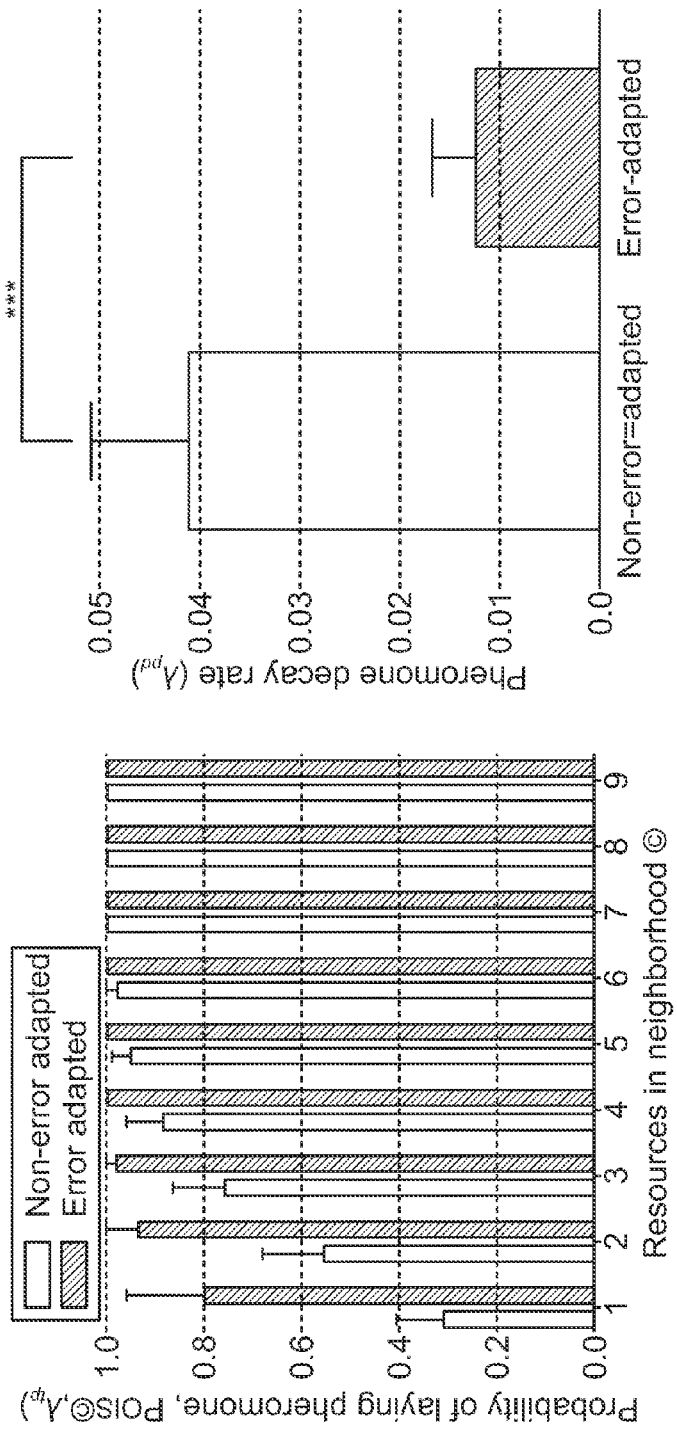

For error-adapted and non-error-adapted swarms foraging on clustered resources, (Fig. 7A) the probability of laying pheromone as a function of the count $c$ of resources in the neighborhood of the most recently found resources (Eq. 4: $k \leftarrow c, \lambda \leftarrow \lambda_{tp}$) and (Fig. 7B) the pheromone waypoint decay rate ($\lambda_{pd}$). Asterisks indicate a statistically significant difference ($p < .001$).

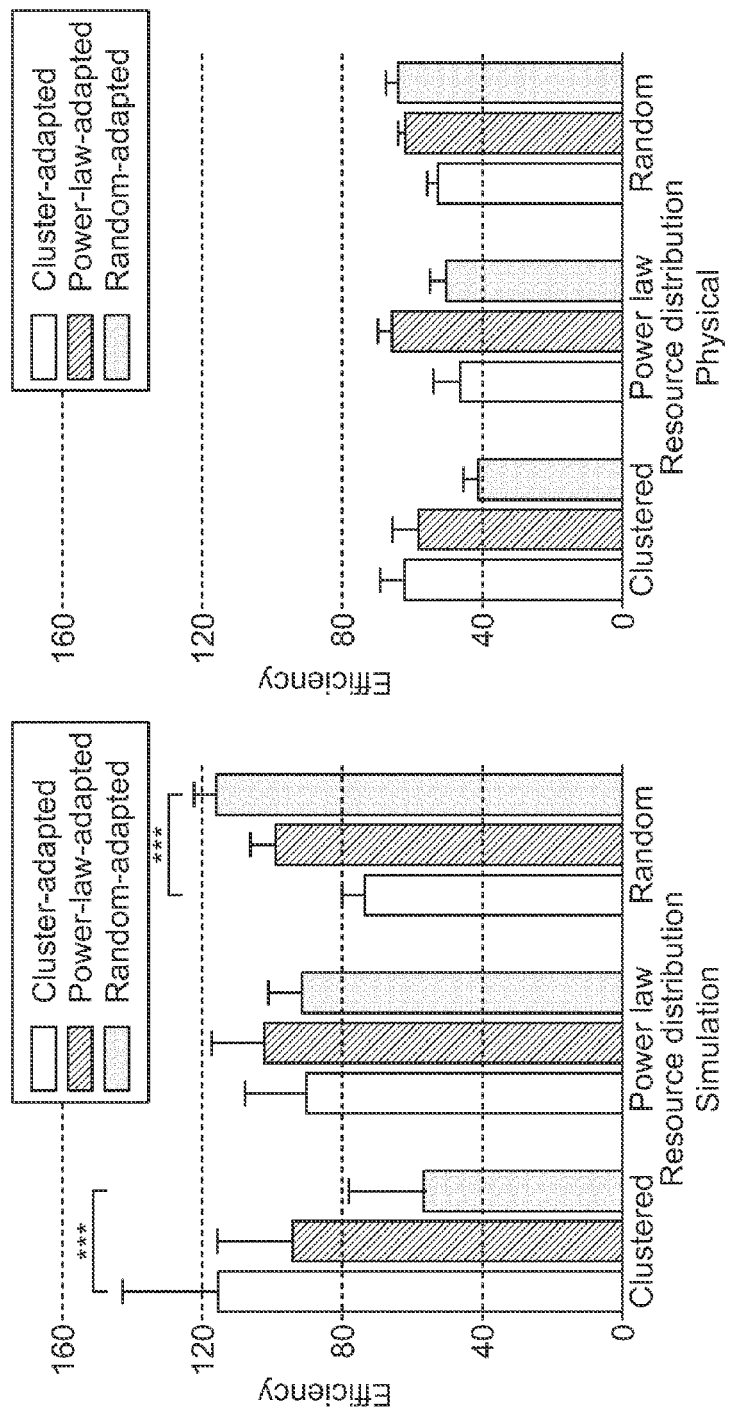
Foraging efficiency (resources collected per hour, per swarm) using parameters adapted to different resource distributions for (Fig. 8A) 6 robots foraging in a simulation that includes sensor error and (Fig. 8B) 6 physical robots. Asterisks indicate a statistically significant difference ($p < .001$).

For error-adapted swarms (top) and non-error-adapted swarms (bottom), (Figs A, C) the probability of returning to a site (Eq. 4: $k \leftarrow c, \lambda \leftarrow \lambda_{sf}$) and (Figs B, C) the probability of laying pheromone (Eq. 4: $k \leftarrow c, \lambda \leftarrow \lambda_{tp}$) given the number of resource $c$ in the neighborhood of a found resource.

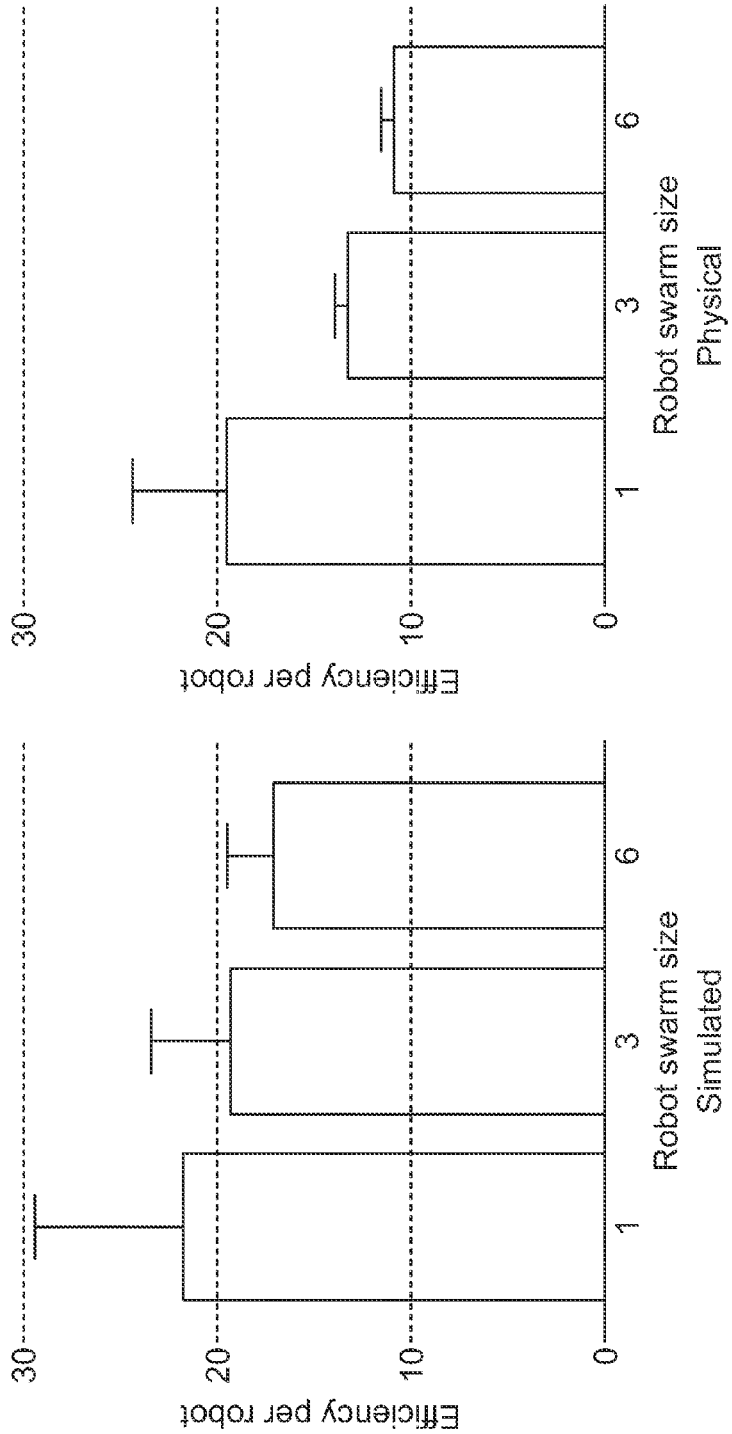
Foraging efficiency (resources collected per hour, per robot) of 1, 3, and 6 robots foraging on a power law distribution for (Fig. 10A) swarms in a simulation that includes sensor error and (Fig. 10B) physical swarms. All results are statistically different ($p < .001$).

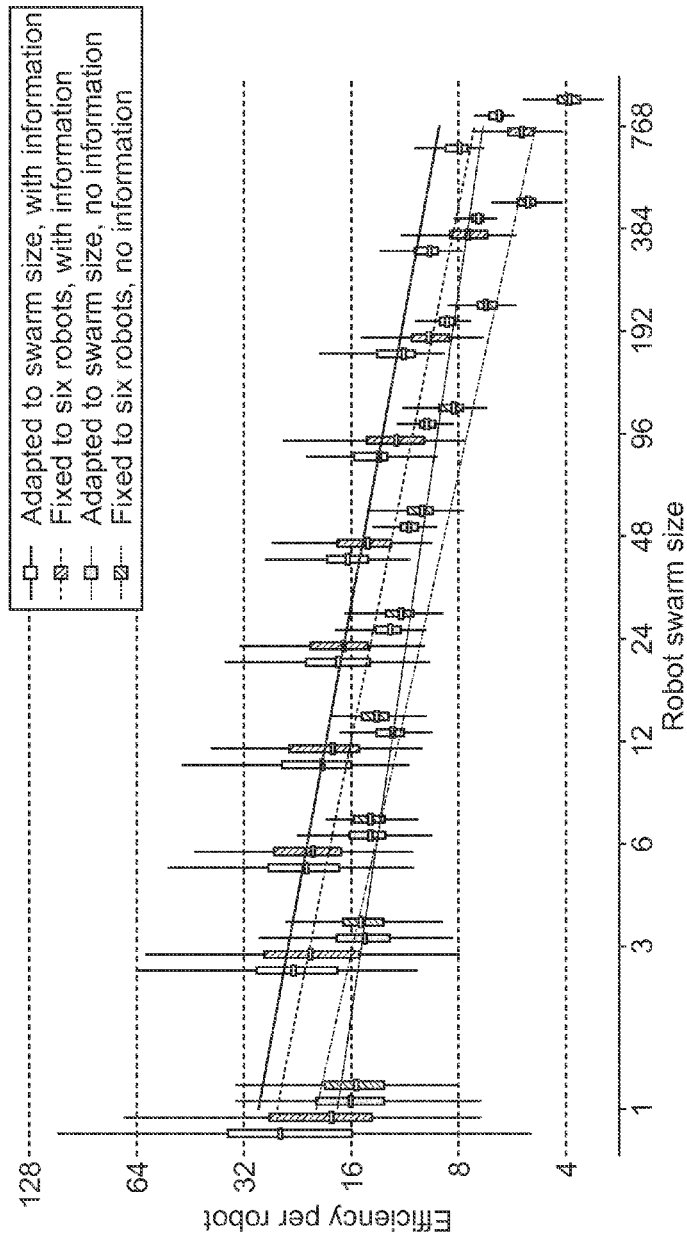

FIG. 11

Foraging efficiency (resources collected per hour, per robot) in simulated swarms of 1 to 768 robots foraging without sensor error. Data are shown on a log scale, and linear regression lines are shown for the log-transformed data. Per-robot efficiency is shown for four cases: using the full CPFA parameter set adapted to swarm size (slope = -0.17, $R^2$ = 0.96), using the full CPFA with parameters fixed to values evolved for a swarm size of 6 (slope = -0.19, $R^2$ = 0.83), using the parameters adapted to swarm size without information (i.e. the CPFA without memory and communication; slope = -0.14, $R^2$ = 0.95), and using parameters fixed to values evolved for a swarm size of 6 without information (slope = -0.21, $R^2$ = 0.91). All linear fits are statistically significant ($p > 0.001$).

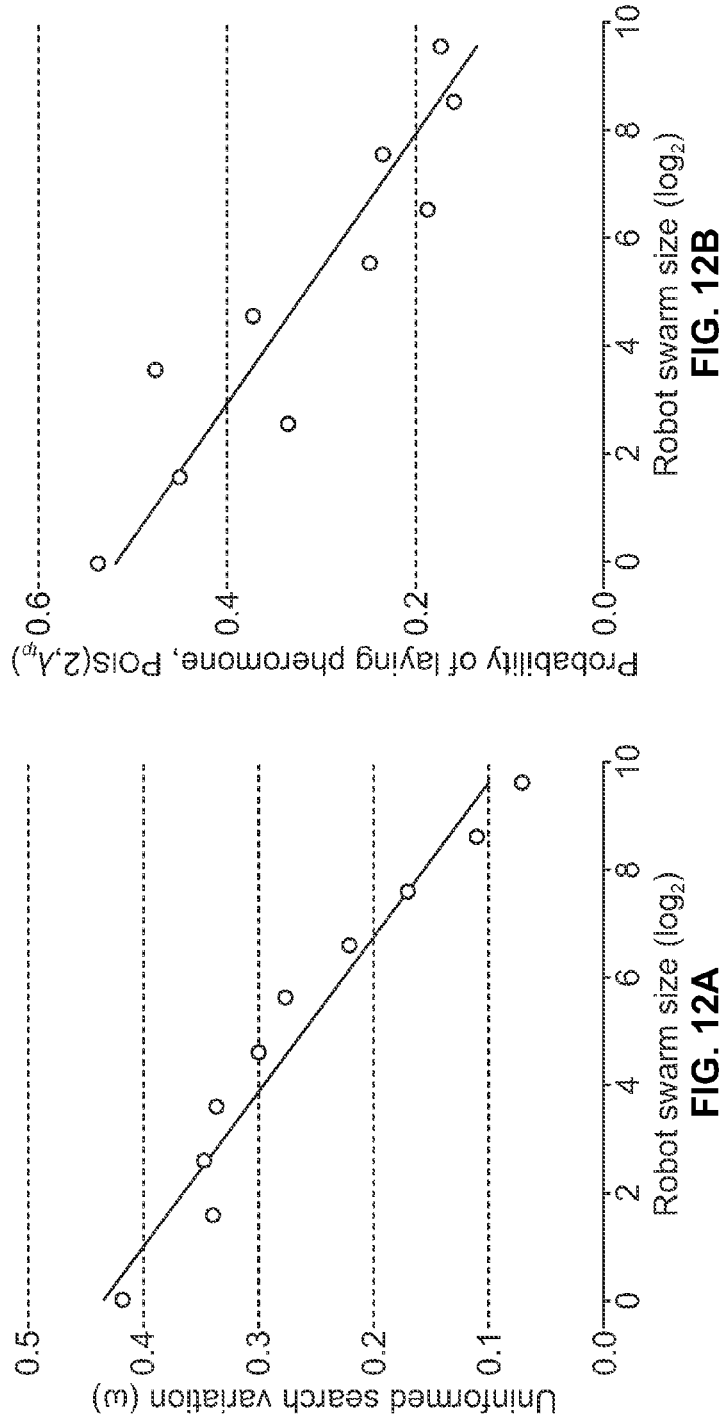

(Fig. 12A) Swarm size versus best evolved uninformed search variation ($\omega$) (slope = -0.040, $R^2$ = 0.84, p < 0.001) (see Fig. 14 in supplementary material for statistical distribution). (Fig. 12B) Swarm size versus best evolved probability of laying pheromone when two resources are found in the resource neighborhood (Eq. 4: $k \leftarrow 2, \lambda \leftarrow \lambda_{lp}$) (slope = -0.035, $R^2$ = 0.94, p < 0.001) (see Fig. 14, supplementary material).

IANT SWARM ROBOTIC PLATFORM AND EVOLUTIONARY ALGORITHMS

RELATED APPLICATIONS

This application claims the benefit of U.S. Provisional Application No. 61/970,805 filed Mar. 26, 2014 and herein incorporated by reference.

STATEMENT REGARDING FEDERALLY SPONSORED RESEARCH & DEVELOPMENT

This invention was made with government support by NSF grant EF-1038682, DARPA CRASH grant P-1070113237, and a James S. McDonnell Foundation Complex Systems Scholar Award. The government has certain rights in the invention.

INCORPORATION BY REFERENCE OF MATERIAL SUBMITTED ON A COMPACT DISC

Not applicable.

BACKGROUND OF THE INVENTION

For robot swarms to operate outside of the laboratory in complex real-world environments, they require the kind of error tolerance, flexibility, and scalability seen in living systems. While robot swarms are often designed to mimic some aspect of the behavior of social insects or other organisms, no systems have yet addressed all of these capabilities in a single framework.

Robot swarms are appealing because they can be made from inexpensive components, their decentralized design is well-suited to tasks that are distributed in space, and they are potentially robust to communication errors that could render centralized approaches useless. A key challenge in swarm engineering is specifying individual behaviors that result in desired collective swarm performance without centralized control.

However, there is no consensus on design principles for producing desired swarm performance from individual agent behaviors. Moreover, the vast majority of swarms currently exist either as virtual agents in simulations or as physical robots in controlled laboratory conditions due to the difficulty of designing robot swarms that can operate in natural environments. For example, even mundane tasks such as garbage collection require operating in environments far less predictable than swarms can currently navigate. Furthermore, inexpensive components in swarm robotics lead to increased sensor error and a higher likelihood of hardware failure compared to state-of-the-art monolithic robot systems.

BRIEF SUMMARY OF THE INVENTION

In one embodiment, the present invention provides a swarm robotics system that emulates ant behaviors which govern memory, communication, and movement, as well as an evolutionary process that tailors those behaviors into foraging strategies that maximize performance under varied and complex conditions.

In other embodiments, the system evolves appropriate solutions to different environmental challenges. Solutions include: i) increased communication when sensed information is reliable and resources to be collected are highly clustered, ii) less communication and more individual memory when cluster sizes are variable, and iii) greater dispersal with increasing swarm size.

In yet other embodiments, the present invention provides a robotic swarm system that may be automatically tuned to produce efficient collective foraging strategies in varied and complex environments. In other embodiments, the present invention provides a robotic swarm system that may be automatically tuned by a genetic algorithm (GA) to produce efficient collective foraging strategies in varied and complex environments.

In further embodiments, the present invention provides a robot swarm that forages for resources and transports them to a central place. Foraging is an important problem in swarm robotics because it generalizes to many real-world applications, such as collecting hazardous materials and natural resources, search and rescue, and environmental cleanup.

In additional embodiments, the present invention provides foraging strategies that implement behaviors that are specified by a central-place foraging algorithm (CPFA). A GA may be further provided to tune CPFA parameters to optimize performance in different conditions.

In other embodiments, the present invention provides an automated process that adapts the high-level behaviors of individual foragers to optimize collective foraging performance in complex environments with varied resource distributions. Also, foraging strategies are provided that are tolerant of real-world sensing and navigation error, and scalable to large swarm sizes. The present invention may take into account interactions between the various behaviors that compose a foraging task (e.g., exploration, exploitation by individuals, and recruitment), and interdependencies between behaviors and the environmental context in which the behaviors evolve.

In other embodiments, the present invention uses a GA that fine-tunes predefined, high-level behaviors to avoid over fitting solutions to idiosyncratic features of either simulated or physical conditions. The GA evolves parameters to control the high-level behaviors. These parameters control the sensitivity threshold for triggering behaviors, the likelihood of transitioning from one behavior to another, and the length of time each behavior should last.

BRIEF DESCRIPTION OF THE SEVERAL VIEWS OF THE DRAWINGS

In the drawings, which are not necessarily drawn to scale, like numerals may describe substantially similar components throughout the several views Like numerals having different letter suffixes may represent different instances of substantially similar components. The drawings illustrate generally, by way of example, but not by way of limitation, a detailed description of certain embodiments discussed in the present document.

FIGS. 4a-4c show how 256 resources are placed in one of three distributions: (a) the clustered distribution has four piles of 64 resources. (b) The power law distribution uses piles of varying size and number: one large pile of 64 resources, 4 medium piles of 16 resources, 16 small piles of 4 resources, and 64 randomly placed resources. (c) The random distribution has each resource placed at a uniform random location.

FIGS. 6a and 6b depict foraging efficiency (resources collected per hour, per swarm) using error-adapted and non-error-adapted parameters for, FIG. 6a, 6 robots foraging in a simulation that includes sensor error and, FIG. 6b, 6 physical robots. Asterisks indicate a statistically significant difference ($p<0.001$).

FIGS. 7a and 7b show that for error-adapted and non-error-adapted swarms foraging on clustered resources, (a) the probability of laying pheromone as a function of the count c of resources in the neighborhood of the most recently found resource (Eq. 4: $k \leftarrow c, \lambda \leftarrow \lambda_{l\ p}$), and (b) the pheromone waypoint decay rate ($\lambda_{pd}$). Asterisks indicate a statistically significant difference ($p<0.001$).

FIGS. 8a and 8b show foraging efficiency (resources collected per hour, per swarm) using parameters adapted to different resource distributions for (a) 6 robots foraging in a simulation that includes sensor error and (b) 6 physical robots. Asterisks indicate a statistically significant difference ($p<0.001$).

FIGS. 10a and 10b depict foraging efficiency (resources collected per hour, per robot) of 1, 3, and 6 robots foraging on a power law distribution for (a) swarms in a simulation that includes sensor error and (b) physical swarms. All results are statistically different ($p<0.001$).

FIG. 11 depicts foraging efficiency (resources collected per hour, per robot) in simulated swarms of 1 to 768 robots foraging without sensor error. Data are shown on a log scale, and linear regression lines are shown for log-transformed data. Per-robot efficiency is shown for four cases: using the full CPFA parameter set adapted to swarm size (slope=$-0.17$, $R^2=0.96$), using the full CPFA with parameters fixed to values evolved for a swarm size of 6 (slope=$-0.19$, $R^2=0.83$), using parameters adapted to swarm size without information (i.e. the CPFA without memory and communication; slope=$-0.14$, $R^2=0.95$), and using parameters fixed to values evolved for a swarm size of 6 without information (slope=$-0.21$, $R^2=0.91$). All linear fits are statistically significant ($p<0.001$).

FIGS. 12a and 12b show swarm size versus best-evolved uninformed search variation ($\omega$) (slope=$-0.035$, $R^2=0.94$, $p<0.001$ (b) Swarm size versus best-evolved probability of laying pheromone when two resources are found in the resource neighborhood (Eq. 4: $k \leftarrow 2, \lambda \leftarrow \lambda_{l\ p}$) (slope= $-0.040$, $R^2=0.84$, $p<0.001$).

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1A:
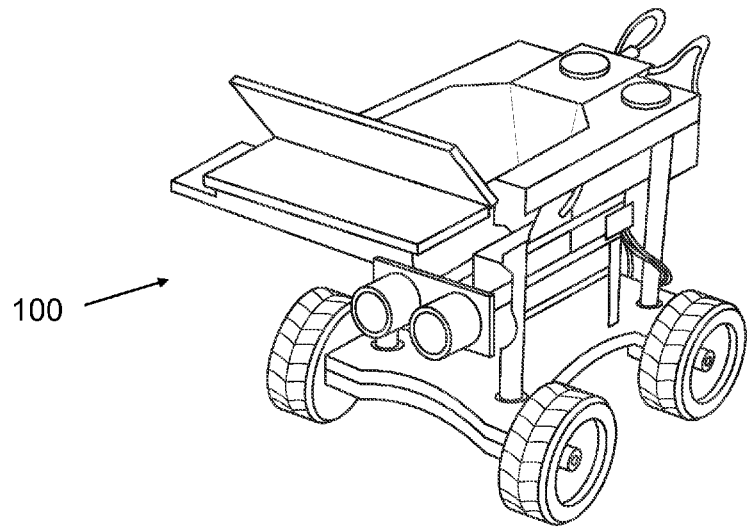
FIG. 1a shows an individual robot that may be used with one embodiment of the present invention.
Figure 1B:
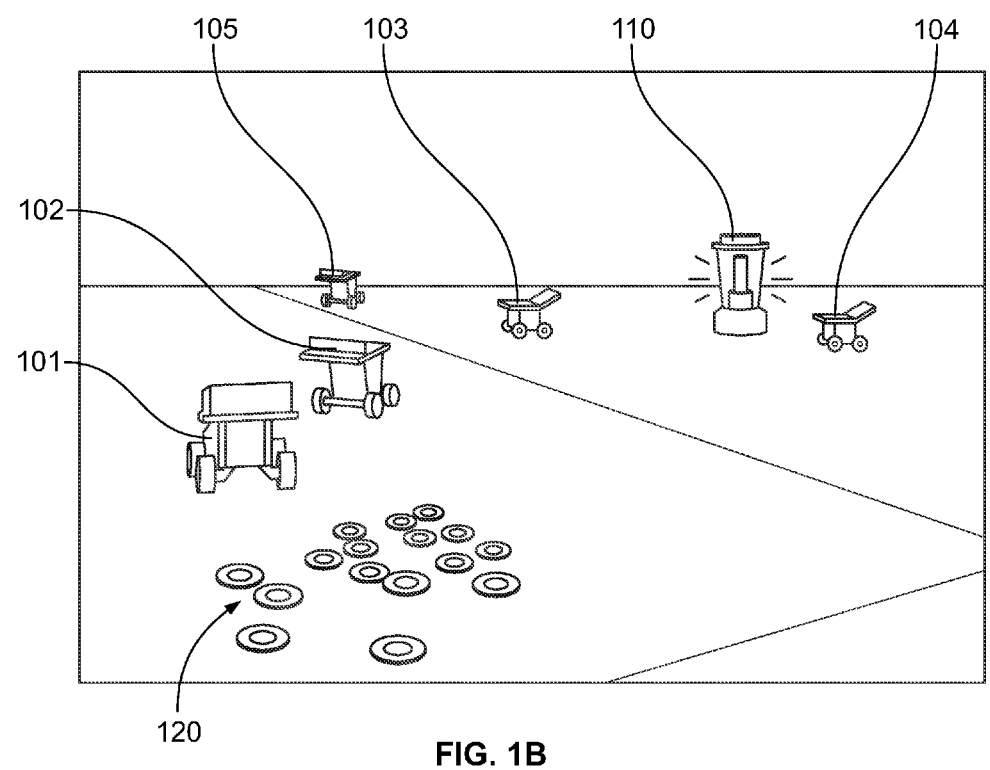
FIG. 1b shows a swarm of robots that may be used with one embodiment of the present invention.

FIG. 1a shows an individual robot that may be used with the present invention. FIG. 1b shows a plurality of robots 101-105 that make up a swarm that use a nest 110. As will be described in further detailed below, the swarm is configured to seek and retrieve one or more resources 120.

To maximize recovery of a resource, the present invention provides foraging strategies that implement behaviors that are specified by a central-place foraging algorithm (CPFA) which also uses a genetic algorithm (GA) to tune CPFA parameters to optimize performance in different conditions. The GA-tuned CPFA is an integrated strategy in which movement, sensing, and communication are evolved and evaluated in an environment with a particular amount of sensing and navigation error, a particular type of resource distribution, and a particular swarm size.

Rather than imitating a specific behavior for a specific subtask, the present invention in one embodiment deploys strategies that use different combinations of navigation, sensing, and communication to accomplish a complete foraging task. This approach mimics the way that ant foraging strategies evolve in nature. Each robot, similar to how ants behave, uses an evolved, integrated strategy tuned to its own particular environment.

Figure 2:
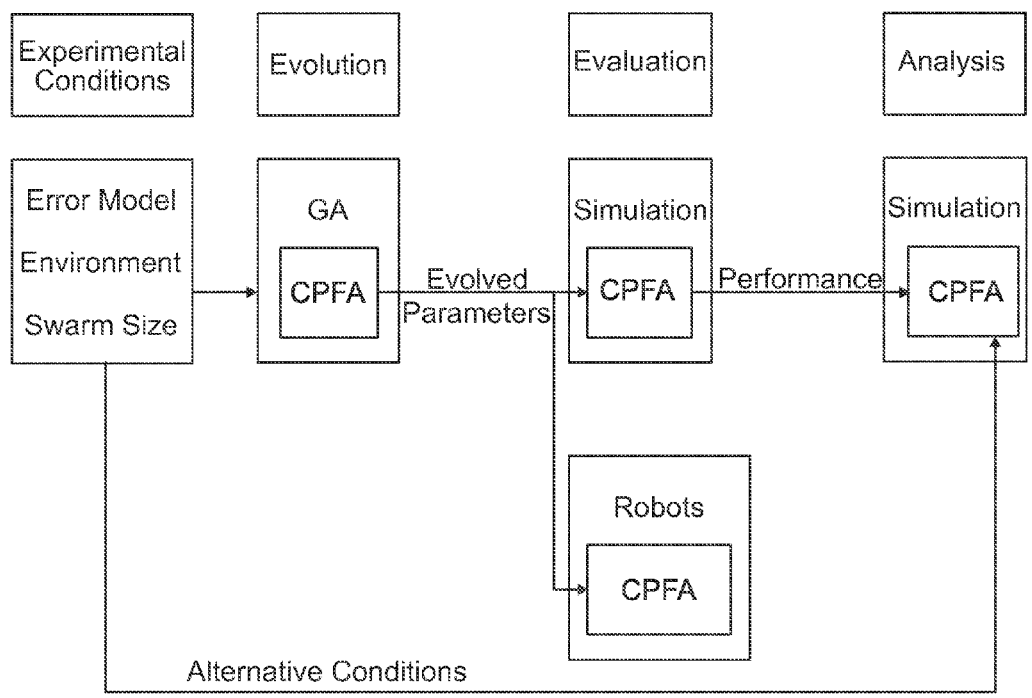
FIG. 2 is a GA used to evolve a foraging strategy (CPFA parameter set) that maximizes resource collection for specified classes of error model, environment, and swarm size.

In one preferred embodiment, the system when fully integrated includes a central-place foraging algorithm (CPFA), a genetic algorithm (GA), physical robots, and a sensor error model. The error tolerance, flexibility, and scalability of the robot swarms were tested under different experimental conditions. A framework for one embodiment of the present approach is shown in FIG. 2. Specific to this embodiment, the system uses a GA to evolve a foraging strategy (CPFA parameter set) that maximizes resource collection for specified classes of error model, environment, and swarm size.

Central-Place Foraging Algorithm

Figure 3A:
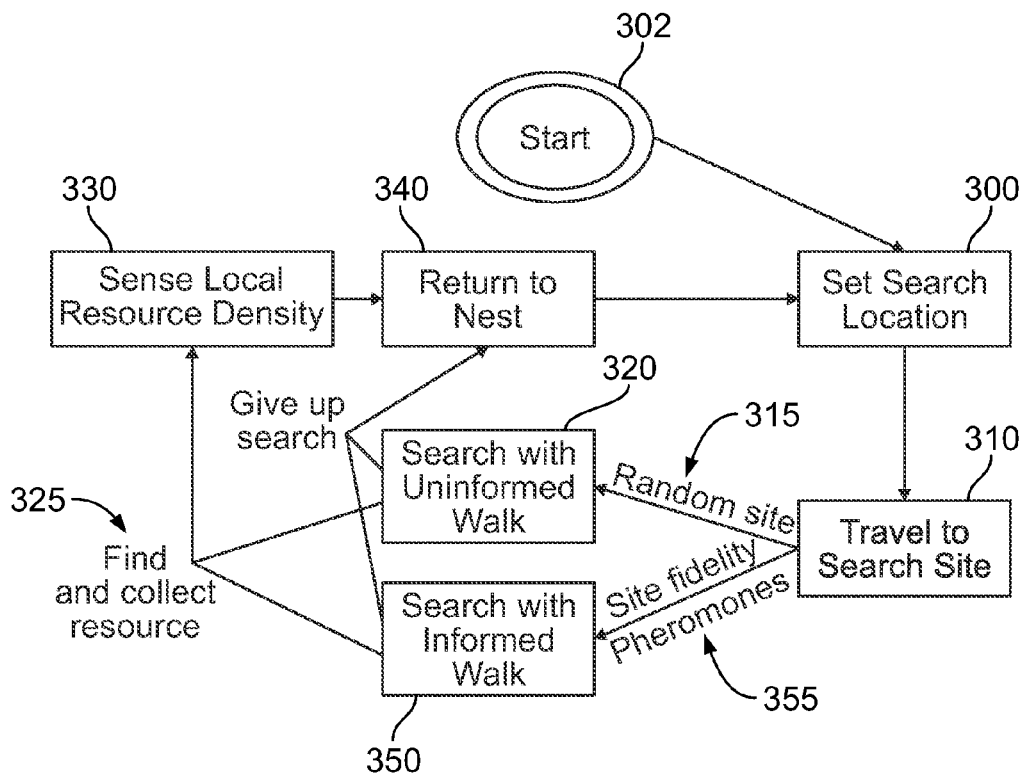
FIG. 3a provides a state diagram describing the flow of behavior for individual robots for one embodiment of the present invention during foraging.

The CPFA implements behaviors as a series of states connected by directed edges with transition probabilities as shown in FIG. 3. The CPFA acts as the high-level controller. Parameters governing the CPFA transitions are listed below in Table 1.

TABLE 1

Set of 7 CPFA parameters evolved by the GA

| Parameter | Description | Initialization Function |
|---|---|---|
| $p_s$ | Probability of switching to searching | $\mathcal{U}(0, 1)$ |
| $p_r$ | Probability of returning to nest | $\mathcal{U}(0, 1)$ |
| $\omega$ | Uninformed search variation | $\mathcal{U}(0, 4\pi)$ |
| $\lambda_{id}$ | Rate of informed search decay | exp(5) |
| $\lambda_{sf}$ | Rate of site fidelity | $\mathcal{U}(0, 20)$ |
| $\lambda_{lp}$ | Rate of laying pheromone | $\mathcal{U}(0, 20)$ |
| $\lambda_{pd}$ | Rate of pheromone decay | exp(10) | in a preferred embodiment, the system is designed to implement the following steps as shown in FIG. 3. Set search location 300: The robot starts at a central nest 302 and selects a dispersal direction, θ, initially from a uniform random distribution, $\mathcal{U}(0, 2\pi)$. In subsequent trips, the robot may set its search location using site fidelity or pheromone waypoints, as described below.

Travel to search site 310: The robot travels along the heading θ, continuing on this path until it transitions to searching with probability $p_s$ at a random site 315.

Search with uninformed walk 320: If the robot is not returning to a previously found resource location via site fidelity or pheromones, it begins searching at the random site using a correlated random walk with fixed step size and direction $\theta_t$ at time t, defined by Equation 1:

$$\theta_t = \mathcal{N}(\theta_{t-1}, \sigma) \quad (1)$$

The standard deviation σ determines how correlated the direction of the next step is with the direction of the previous step. Robots initially search for resources using an uninformed correlated random walk, where σ is assigned a fixed value in Equation 2:

$$\sigma \leftarrow \omega \quad (2)$$

If the robot discovers a resource, it will collect the resource 325 and transition to sensing the local resource density 330. Robots that have not found a resource will give up searching and return to the nest 340 with probability $p_r$, and repeat the steps described above until a member of the swarm finds a resource.

Algorithm 1 Central-Place Foraging Algorithm

```
 1: Disperse from nest to random location
 2: while experiment running do
 3:     Conduct uninformed correlated random walk
 4:     if resource found then
 5:         Collect resource
 6:         Count number of resources c near current location l_f
 7:         Return to nest with resource
 8:         if POIS(c, λ_lp) > U(0, 1) then
 9:             Lay pheromone to l_f
10:         end if
11:         if POIS(c, λ_sf) > U(0, 1) then
12:             Return to l_f
13:             Conduct informed correlated random walk
14:         else if pheromone found then
15:             Travel to pheromone location l_p
16:             Conduct informed correlated random walk
17:         else
18:             Choose new random location
19:         end if
20:     end if
21: end while
```

Search with informed walk 350: If the robot is informed about the location of resources (via site fidelity or pheromones 355), it searches using an informed correlated random walk, where the standard deviation σ is defined by Equation 3:

$$\alpha = \omega + (4\pi - \omega)e^{-\lambda_{id}t} \quad (3)$$

The standard deviation of the successive turning angles of the informed random walk decays as a function of time t, producing an initially undirected and localized search that becomes more correlated over time. This time decay allows the robot to search locally where it expects to find a resource, but to straighten its path and disperse to another location if the resource is not found. If the robot discovers a resource, it will collect the resource by adding it to a list of collected items, and transition to sensing the local resource density. Robots that have not found a resource will give up searching and return to the nest with probability $p_r$.

Sense local resource density 330: When the robot locates and collects a resource, it records a count c of resources in the immediate neighborhood of the found resource. This count c is an estimate of the density of resources in the local region.

Return to nest 340: After sensing the local resource density, the robot returns to the nest. At the nest, the robot uses c to decide whether to use information by i) returning to the resource neighborhood using site fidelity, or ii) following a pheromone waypoint. The robot may also decide to generate a resource location communication or signal that identifies the resource location such as a pheromone waypoint.

Figure 3B:
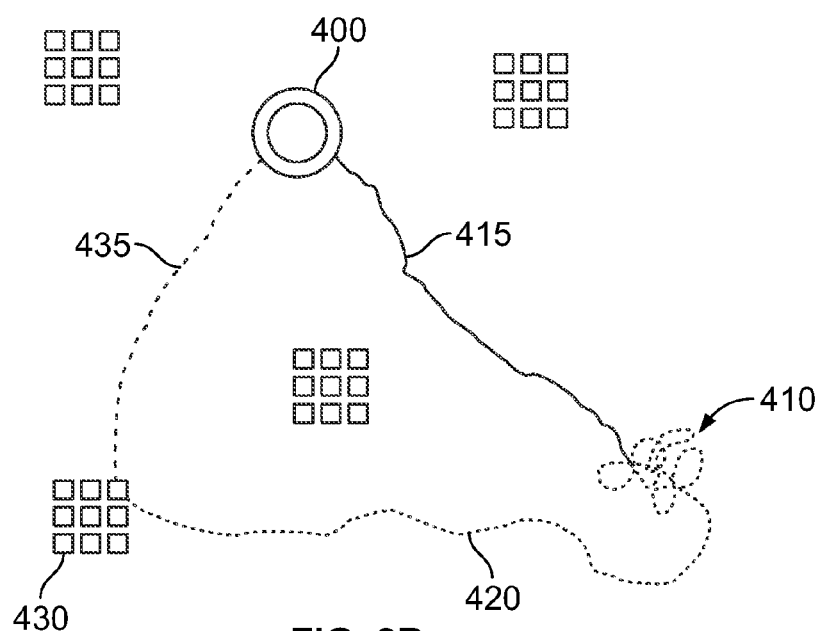
FIG. 3b is an example of a foraging behavior for an embodiment of the invention. The robot begins its search at a central nest site (double circle) and sets a search location. The robot then travels to the search site (solid line). Upon reaching the search location, the robot searches for resources (dotted line) until a resource (square) is found and collected. After sensing the local resource density, the robot returns to the nest (dashed line).

FIG. 3b provides a simple example of a foraging behavior for an embodiment of the invention. The robot begins its search at a central nest site 400 (double circle) and sets a search location 410. The robot then travels in a relatively straight line 415 to the search site (solid line). Upon reaching the search location, the robot searches in a decaying random pattern 420 for resources (dotted line) until a resource 430 (square) is found and collected. After sensing the local resource density, the robot returns to the nest in a relatively straight line 435 (dashed line).

In yet another preferred embodiment, the present invention provides a method of operating a plurality robot to perform foraging for a resource, comprising the steps of: programming each robot to know where the nest is and to have an inherent leash; a: each robot is programmed to conduct a uniformed search by traveling to a random first location along a substantially straight path; b: upon reaching a first, randomly selected or final location, each of robots performs a uniformed correlated random walk for a first predetermined time period set by each robot independently of each other for random length of times; c: if during the first predetermined time period no resource is found, the robot returns to the nest; d: upon returning to the nest, each robot repeats steps a-c until a resource is found by at least one robot; e: upon finding a resource, the robot finding the resource collects one or more resources, independently assigns a resource grade to the location, which may be determined by the quantity of resources found and/or the density of the resource, returns to the nest and depending on the resource grade 1) repeats steps a-c, 2) returns to the location without sharing the information with other robots, or 3) transmits a resource found signal informing the other robots of the resource location and the signal may be based on the resource or resource grade; and f: upon receiving a resource found signal, depending on the grade of the signal, the robot receiving the signal does 1) repeats steps a-c, or 2)

travels to the location and performs step e if a resource is found and if a resource is not found, performs an informed correlated random walk.

Additional steps may include 1) having the signals decay over time; 2) having the informed correlated random walk decay into a uniformed correlated random walk over time; 3) using a genetic algorithm to optimize the above steps for unique environments; 4) making the resource grade a function of the environments in which the robots are operating; and 5) adapting and/or changing the above behaviors to tune the system to an environment.

Other embodiments of the present invention provide a method of operating a plurality of robots to perform foraging for a resource, comprising the following steps. Programming each of the robots to start at a nest and to select a dispersal direction from a uniform random distribution. The robots travel along the dispersal direction until transitioning to a search mode upon reaching a search site, where the robot performs a correlated random walk with fixed step size and direction and using a standard deviation to determine how correlated the direction of the next step of the robot is with the direction of the previous step. If no resource is found within predetermined time t independently determined by each of said robots, the robot returns to the nest and repeats the above steps.

When a robot locates a resource, the robot locating the resource performs the steps of collecting the resource, recording a count c of resources found, returning to the nest, and upon returning, the robot generates a resource location communication. Next, the robot returns to the resource location if c exceeds a uniform random value and, if c is less than the uniform random value, the robot follows a resource location communication to another location if a resource location communication from another robot is available and if no resource location communication is available, the robot will choose its next search location at random.

For robots conducting a search based on receiving a resource location communication, the robot searches the resource location using an informed correlated random walk, where the standard deviation of the successive turning angles of the informed random walk decays as a function of time t randomly determined by the robot, producing an initially undirected and localized search that becomes more correlated over time. In addition, a robot may transmit a resource location communication to a server and the server selects a resource location from the list and transmits it to one or more robots. Lastly, a genetic algorithm may be used to optimize the method and steps described above.

Information decisions may be governed by parameterization of a Poisson cumulative distribution function (CDF) as defined by Equation 4:

$$POIS(k, \lambda) = e^{-\lambda} \sum_{i=0}^{\lfloor k \rfloor} \frac{\lambda^i}{i!} \qquad (4)$$

The Poisson distribution represents the probability of a given number of events occurring within a fixed interval of time.

In the CPFA, an event corresponds to finding an additional resource in the immediate neighborhood of a found resource. Therefore, the distribution $POIS(c,\lambda)$ describes the likelihood of finding at least c additional resources, as parameterized by $\lambda$. The robot returns to a previously found resource location using site fidelity if the Poisson CDF, given the count c of resources, exceeds a uniform random value: $POIS(c,\lambda_{s\!f}) > \mathcal{U}(0,1)$. Thus, if c is large, the robot is likely to return to the same location using site fidelity on its next foraging trip. If c is small, it is likely not to return, and instead follows a pheromone to another location if pheromone is available. If no pheromone is available, the robot will choose its next search location at random. The robot makes a second independent decision based on the count c of resources: it creates a pheromone waypoint for a previously found resource location if $POIS(c,\lambda_{lp}) > \mathcal{U}(0,1)$.

Upon creating a pheromone waypoint, or location communication or signal, a robot transmits the waypoint or location to a list maintained by a central server. As each robot returns to the nest, the server selects a waypoint from the list (if available) and transmits it to the robot. New waypoints are initialized with a value of 1. The strength of the pheromone, γ, decays exponentially over time t as defined by Equation 5:

$$\gamma = e^{-\lambda_{pd} t} \qquad (5)$$

Waypoints may be removed once their value drops below a threshold of 0.001.

Genetic Algorithm

There are an uncountable number of foraging strategies that can be defined by the real-valued CPFA parameter sets in Table 1 (even if the 7 parameters were limited to single decimal point precision, there would be $7^{10}$ possible strategies). The present invention, in one embodiment, addresses this intractable problem by using a GA to generate foraging strategies that maximize foraging efficiency for a particular error model, resource distribution, and swarm size.

The GA evaluates the fitness of each strategy by simulating robots that forage using the CPFA parameter set associated with each strategy. Fitness is defined as the foraging efficiency of the robot swarm and the total number of resources collected by all robots in a fixed time period. Because the fitness function must be evaluated many times, the simulation must run quickly. Thus, a parsimonious simulation may be used that uses a gridded, discrete world without explicitly modeling sensors or collision detection. This simple fitness function also helps to mitigate condition-specific idiosyncrasies and avoid over fitted solutions.

A population of 100 simulated robot swarms for 100 generations may be used for recombination and mutation. Each swarm's foraging strategy is randomly initialized using uniform independent samples from the initialization function for each parameter (Table 1). Five parameters may be initially sampled from a uniform distribution, $\mathcal{U}(a, b)$, and two from exponential distributions, exp(x), within the stated bounds. Robots within a swarm use identical parameters throughout the hour-long simulated foraging experiment. During each generation, all 100 swarms undergo 8 fitness evaluations, each with different random placements drawn from the specified resource distribution.

At the end of each generation, the fitness of each swarm is evaluated as the sum total of resources collected in the 8 runs of a generation. Deterministic tournament selection with replacement (tournament size=2) is used to select 99 candidate swarm pairs. Each pair is recombined using uniform crossover and 10% Gaussian mutation with fixed standard deviation (0.05) to produce a new swarm population. Elitism was used to copy the swarm with the highest fitness, unaltered, to the new population—the resulting 100 swarms make up the next generation. After 100 generations, the evolutionary process typically converges on a set of similar foraging strategies. The strategy with highest fitness at generation 100 is kept as the best foraging strategy.

The evolutionary process was repeated 10 times to generate 10 independently evolved foraging strategies for each error model, resource distribution, and swarm size. Foraging efficiency was then evaluated for of each of those 10 strategies using 100 new simulations, each of which uses the CPFA with specified parameters and a new random placement of resources.

Experimental Setup

Physical: Each physical experiment runs for one hour on a 100 m$^2$ indoor concrete surface. Robots forage for 256 resources represented by 4 cm$^2$ QR matrix barcode tags. A cylindrical illuminated beacon with radius 8.9 cm and height 33 cm marks the center nest to which the robots return once they have located a resource. This center point is used for localization and error correction by the robots' ultrasonic sensors, magnetic compass, and forward-facing camera. All robots involved in an experiment are initially placed near the beacon. Robots are programmed to stay within a 'virtual fence' that is a radius of 5 m from the beacon. In every experiment, QR tags representing resources are arranged in one of three distributions (see FIG. 4): clustered (4 randomly placed clusters of 64 resources each), power law (1 large cluster of 64, 4 medium clusters of 16, 16 small clusters of 4, and 64 randomly scattered), or random (each resource placed at a random location).

Robot locations are continually transmitted over one-way WiFi communication to a central server and logged for later analysis. Robots do not pick up physical tags, but instead simulate this process by reading the tag's QR code, reporting the tag's unique identification number to a server, and returning within a 50 cm radius of the beacon, providing a detailed record of tag discovery. Tags can only be read once, simulating tag retrieval.

Simulated: Swarms of simulated robot agents search for resources on a 125×125 cellular grid; each cell simulates an 8×8 cm square. The simulation architecture replicates the physical dimensions of actual robots, their speed while traveling and searching, and the area over which they can detect resources. The spatial dimensions of the grid reflect the distribution of resources over a 100 m$^2$ physical area, and agents search for a simulated hour. Resources are placed on the grid (each resource occupies a single grid cell) in one of three distributions: clustered, power law, or random. The same resource distribution was used as in the physical experiments, although physical and simulated resources are not in the same locations. Instead, each individual pile is placed at a new random, non-overlapping location for each fitness evaluation to avoid bias or convergence to a specific resource layout.

Results

Results discussed below compare parameters and foraging efficiency of the best evolved foraging strategies, where efficiency is the total number of resources collected by a robot swarm during an hour-long experiment. Results that compare parameters show means and standard deviations of the 10 foraging strategies evolved in simulation; error bars (when shown) indicate one standard deviation of the mean. Results that compare foraging efficiency show the single best of those 10 strategies evaluated 100 times in simulation and 5 times in physical robots, for each error model, resource distribution, and swarm size.

Error Tolerance

Figures 5A, 5B, 5C:
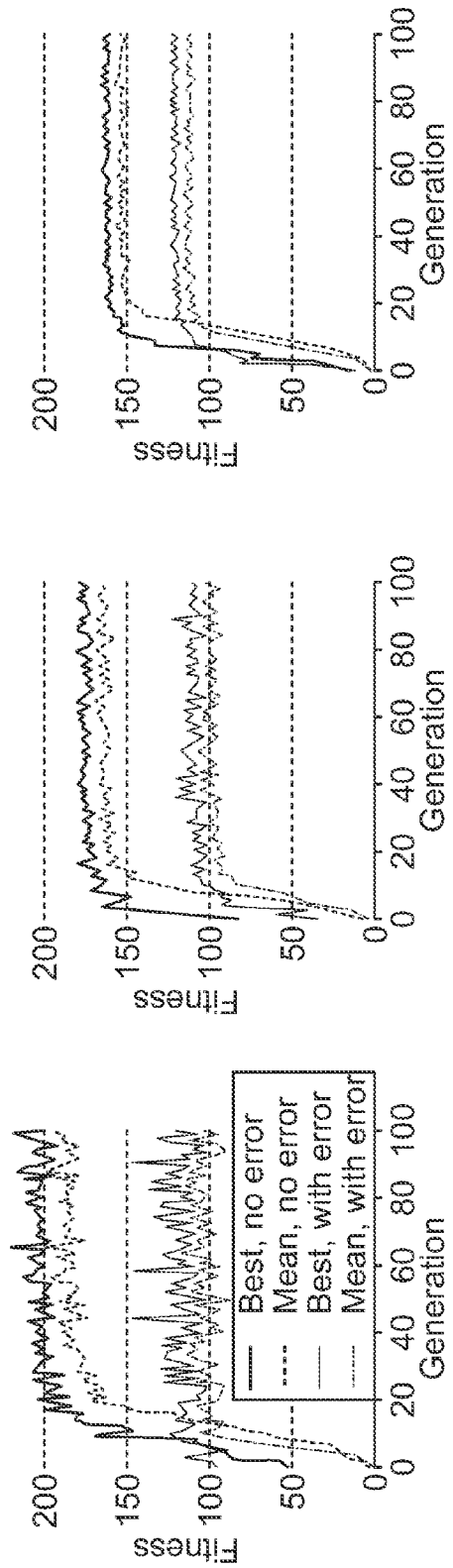
FIGS. 5a-5c show best and mean fitness, measured as foraging efficiency (resources collected per hour, per swarm) for simulated swarms foraging on (a) clustered, (b) power law, and (c) random resource distributions with and without real-world sensor error. Results are for 100 replicates.

FIG. 5 shows best and mean fitness curves for simulated robot swarms foraging with and without sensor error on clustered, power law, and randomly distributed resources. Robot swarms adapted for randomly distributed resources have the most stable fitness function, followed by power-law-adapted and cluster-adapted swarms. Fitness stabilizes for all three distributions after approximately 20 generations. Real-world sensor error has the largest effect on power-law-adapted swarms, reducing mean fitness by 44% by generation 100 (mean fitness without error=170, mean fitness with error=96). Sensor error reduces mean fitness by 42% for cluster-adapted swarms (without error=190, with error=110), and by 25% for random-adapted swarms (without error=160, with error=120). Thus, not surprisingly, robots with error are always less efficient than robots without error. In idealized simulations without robot error, efficiency is higher for the more clustered distributions; but when the model of error is included, efficiency is highest for randomly dispersed resources.

FIG. 6 shows the efficiency of simulated and physical robot swarms foraging on clustered, power law, and random resource distributions using error-adapted and non-error-adapted parameters. The GA evolves error-adapted swarms that outperform non-error-adapted swarms in worlds with error. The error-adapted strategies improve efficiency on the clustered and power law distributions: error tolerance is 14% and 3.6% for simulated robots, and 14% and 6.5% for physical robots as shown in FIG. 6. The effect of error-adapted parameters in simulated robots foraging on the clustered distribution was significant ($t(198)=3.6$, $p<0.001$), and the effect for simulated robots on the power law distribution was marginally significant ($t(198)=1.8$, $p=0.07$). Efficiency was not significantly different for simulated or physical robots foraging on randomly distributed resources.

FIGS. 7a and 7b compare the probability of laying pheromone (FIG. 7a) and the rate of pheromone decay (FIG. 7b) in error-adapted and non-error-adapted swarms foraging for clustered resources. Error-adapted strategies are significantly more likely to use pheromones than non-error-adapted strategies when 4 or fewer resources are detected in the local neighborhood of a found resource (i.e. when $c \leq 4$, see FIG. 7a. It was interpreted that the increase in pheromone use for small c was a result of sensor error (only 43% of neighboring resources are actually detected). The evolved strategy compensates for the decreased detection rate by increasing the probability of laying pheromone when c is small. In other words, given sensor error, a small number of detected tags indicate a larger number of actual tags in the neighborhood, and the probability of laying pheromone reflects the probable number of tags actually present.

In error-adapted swarms, pheromone waypoints are evolved to decay 3.3 times slower than in swarms evolved without sensor error as shown in FIG. 7b. Slower pheromone decay compensates for both positional and resource detection error. Robots foraging in worlds with error are less likely to be able to return to a found resource location, as well as being less likely to detect resources once they reach the location, therefore they require additional time to effectively make use of pheromone waypoints.

Sensor error affects the quality of information available to the swarm. The experiments show that including sensor error in the clustered simulations causes the GA to select for pheromones that are laid under more conditions and that last longer. This increased use of pheromones is unlikely to lead to overexploitation of piles because robots will have error in following the pheromones and in detecting resources. Thus, while pheromones can lead to overexploitation of found piles (and too little exploration for new piles) in idealized simulations, overexploitation is less of a problem for robots with error.

FIGS. 5-7 show that error has a strong detrimental effect on the efficiency of swarms foraging for clustered resources.

Swarms foraging on random distributions are only affected by resource detection error; however, the efficiency of cluster-adapted swarms is reduced by both positional and detection error. Generally speaking, different types of error affect different strategies in different ways. In situations where resources are clustered, as is often the case in the real world, it is beneficial to adapt to the sensor error.

Flexibility

FIG. 8 shows the efficiency of simulated and physical robot swarms evolved on one resource distribution (clustered, power law, or random), then evaluated on all three distributions. All results are for 6 simulated or physical robots foraging with error. As expected, robot swarms evolved for each of the three distributions perform best when evaluated on that distribution. That is, cluster-adapted swarms perform best on the clustered distribution, power-law-adapted swarms perform best on the power law distribution, and random-adapted swarms perform best on the random distribution. Strategy specialization is best illustrated in foraging experiments on the clustered distribution: the cluster-adapted strategies are twice as efficient as the random-adapted strategies.

FIG. 8 demonstrates that the GA is able to evolve both specialist and generalist strategies. If the resource distribution is known a priori, then the robot swarm will be most efficient when using a specialist strategy adapted for that distribution. However, power-law-adapted strategies are sufficiently flexible to function well on all three distributions. Simulated robot swarms using power-law-adapted parameters are 82% as efficient as cluster-adapted swarms when evaluated on a clustered distribution, and 86% as efficient as random-adapted swarms when evaluated on a random distribution. The power-law-adapted strategy is also the most flexible strategy for physical robot swarms: power-law-adapted swarms are 93% as efficient as cluster-adapted swarms on a clustered distribution, and 96% as efficient as random-adapted swarms on a random distribution.

Figure 9A:
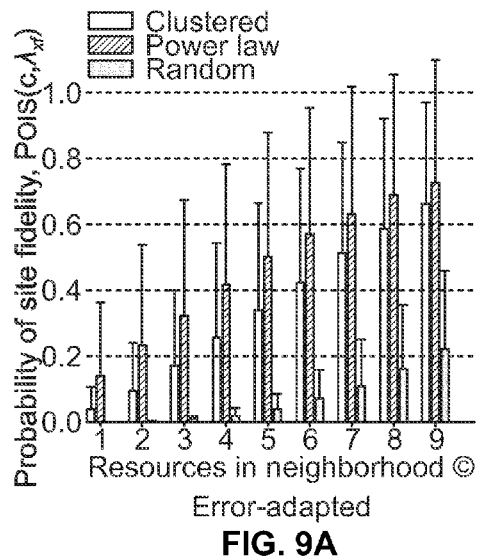
FIGS. 9a-9d show for error-adapted swarms (top) and non-error-adapted swarms (bottom), (a,c) the probability of returning to a site (Eq. 4: $k \leftarrow c, \lambda \leftarrow \lambda_{s\ r}$) and (b,d) the probability of laying pheromone (Eq. 4: $k \leftarrow c, \lambda \leftarrow \lambda_{l\ p}$) given the number of resources c in the neighborhood of a found resource.
Figure 9B:
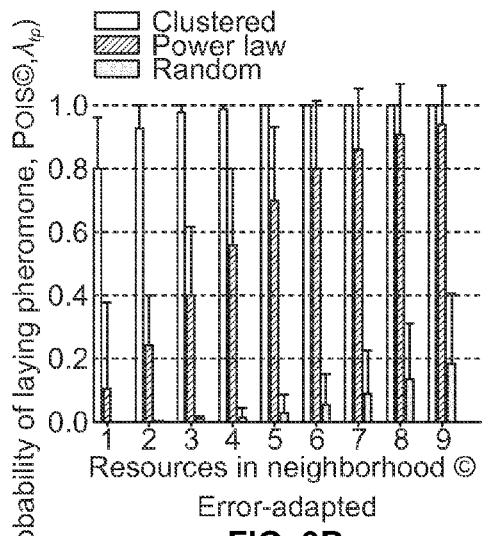
Figure 9C:
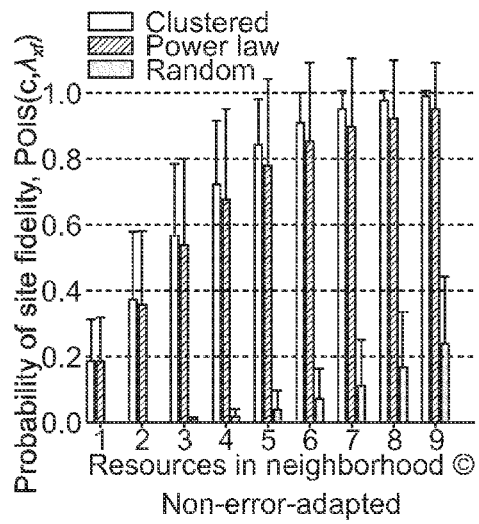
Figure 9D:
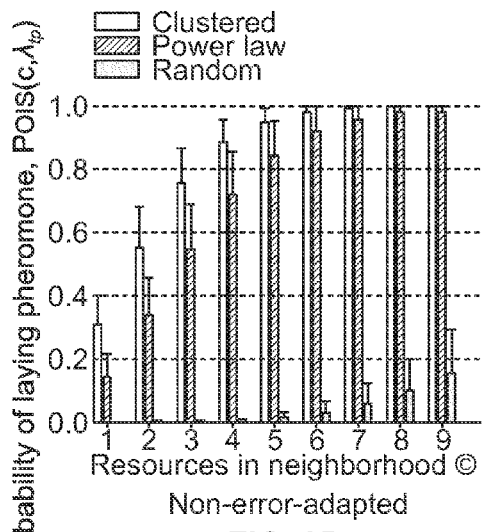

While FIG. 8 demonstrates the expected result that specialist strategies are most efficient, FIGS. 9a-9d illustrates several ways in which strategies are specialized. The figures show the probability of exploiting information about resource density in the local neighborhood of a found resource in worlds with error (top) and worlds without error (bottom) by returning to the site via site fidelity (FIGS. 9a and 9c) or laying pheromone (FIGS. 9b and 9d). Error-adapted swarms evolved to forage for clustered distributions show large and consistent differences from swarms evolved for power law distributions: they are 3.5 times less likely to return to a site via site fidelity with a single resource in the local neighborhood (FIG. 9a), and 7.8 times more likely to lay pheromone (FIG. 9b). Non-error-adapted swarms evolved to forage for clustered distributions are equally likely to return to a site via site fidelity with a single resource in the local neighborhood (FIG. 9c), but twice as likely to lay pheromone (FIG. 9d), compared to swarms evolved for power law distributions. In all cases, swarms evolved for random distributions have a significantly lower probability of returning to a site via site fidelity or pheromones.

These results show differences in how each strategy is evolved to use information for different resource distributions, and how these strategies adapt to error by changing how swarms communicate information. Cluster-adapted strategies make frequent use of both memory (site fidelity) and communication (pheromones). Power-law-adapted strategies are nearly equally likely to use memory as cluster-adapted strategies (FIGS. 9a and 9c), but they are less likely to use pheromones (FIGS. 9b and 9d). In contrast, swarms foraging on random distributions neither benefit from information, nor evolve to use it. This result also helps to explain why random-adapted swarms with error experience a relatively small change in fitness (FIG. 5c): information is irrelevant for random-adapted strategies, therefore error in information has no effect on swarms using these strategies.

The differences among the strategies are most evident when the local resource density estimate c is small: site fidelity and laying pheromones are both effectively absent in random strategies, but they are important components of strategies for clustered distributions. Additionally, it is particularly likely that c will be small in the environment during evaluation when resources are distributed at random. Thus, for clustered distributions, robots are both more likely to lay pheromones for any given c, and more likely to detect large c in the environment, further increasing the probability that pheromones will be laid. This illustrates that the likelihood of a particular behavior being used depends both on the rules that have evolved and on the environment in which it is evaluated.

This point is further illustrated by considering the response to encountering large c: the random strategy evolves a non-zero probability of using site fidelity and laying pheromones when nine resources are discovered. However, the probability of encountering a cluster with nine adjacent resources is vanishingly small in a random resource distribution. Since that condition is never encountered, there is no selective pressure on behaviors under that condition. Thus, the probability of laying pheromone in a random-adapted strategy is effectively zero because the GA evolves zero probability for the cases that are actually encountered.

When interpreting FIG. 9, it is important to note tradeoffs and interactions among behaviors. If a robot decides to return to a site via site fidelity, it necessarily cannot follow the pheromone (Alg. 1, lines 11-16). Thus, the decision to return to a site via site fidelity preempts the decision to follow pheromones, such that the probability of following pheromone is at most 1-POIS(c,$\lambda_{s\,f}$). However, a robot can both lay a pheromone to a site (Alg. 1, lines 8-9) and return to that site via site fidelity (Alg. 1, lines 11-13). Furthermore, a robot can return to its own previously discovered site by following its own pheromone. This alternative method of returning to a previously found resource by a robot following its own pheromone may in part explain the lower values of POIS(c,$\lambda_{s\,f}$) for the error-adapted clustered strategy: POIS(c,$\lambda_{s\,f}$) may be low because POIS(c,$\lambda_{lp}$) is high (FIGS. 9a and 9b).

These strategies produced by the GA logically correspond with the resource distribution for which they were evolved. All of the resources in the clustered distribution are grouped into large piles, so finding a single resource is predictive of additional resources nearby. Power-law-adapted swarms are more selective when deciding to share a resource location because robots encounter both large piles and small piles, as well as randomly scattered resources; thus, power-law-adapted swarms have evolved to be more cautious when laying pheromones to avoid recruiting to low-quality resource sites. The power-law-adapted strategies are also the most variable in their use of site fidelity and pheromones, suggesting that many combinations of the two are effective given a distribution with a variety of pile sizes.

Scalability

FIG. 10 shows the efficiency per robot of simulated and physical swarms with 1, 3, and 6 robots foraging on a power law resource distribution in a world with error. Not surprisingly, it was observed that both simulated and physical swarms collect more resources as swarm size increases, however larger swarms are less scalable. In simulation, scalability to 3 robots is 89%, while scalability to 6 robots is 79% (FIG. 10a); in physical experiments, scalability to 3 robots is 68%, while scalability to 6 robots is 56% (FIG. 10b).

The simulation accurately represents the efficiency of a single robot, but increasingly overestimates swarm efficiency as swarm size increases: 1 simulated robot is 1.1 times more efficient than 1 physical robot, while a simulated swarm of 3 robots is 1.4 times more efficient than a physical swarm of 3, and a simulated swarm of 6 is 1.6 times more efficient than a physical swarm of 6. It is hypothesized that this increasing discrepancy is a result of inter-robot interference in the real world that is not captured in the simulation.

FIG. 11 shows how efficiency per robot changes as swarm size increases from 1 to 768 robots. As shown in FIGS. 10a and 10b, there is an increase in overall swarm efficiency, but a decrease in per-robot efficiency, as swarm size scales up. The solid line in FIG. 11 shows how per-robot foraging efficiency scales when robots forage on a power law distribution (without sensor error) and robots are able to adapt behaviors to swarm size (slope on logged axes=-0.17, $R^2$=0.96, p<0.001). The scalability for 768 robots using the full CPFA is 27%. The efficiency of subsets of the full CPFA were compared at different swarm sizes to assess which behaviors contribute most to scalability.

The other three lines in FIG. 11 show how efficiency scales when swarms are prevented from adapting the full CPFA to the environment in which they are evaluated. The dashed line shows the efficiency of swarms that use a fixed set of parameters evolved for a swarm size of 6 (i.e. parameters are evolved for a swarm size of 6, but evaluated in swarm sizes of 1 to 768). Comparing the solid line to the dashed line shows how adapting to swarm size improves efficiency. The difference in efficiency (FIG. 11, solid vs. dashed) increases as swarm size increases. For example, adapting to a swarm size of 24 improves overall swarm efficiency by 4.0%, and adapting to a swarm size of 768 improves swarm efficiency by 51%.

The dash-dotted line shows the efficiency of swarms that adapt to swarm size but are unable to use information (site fidelity and pheromones are disabled so that CPFA parameters $\lambda_{id}$, $\lambda_{sf}$, $\lambda_{lp}$, and $\kappa_{pd}$ have no effect on robot behavior. By comparing the efficiency of swarms with and without information (FIG. 11, solid vs. dash-dotted), it was observed that adapting to use information improves swarm efficiency by an average of 46% across all swarm sizes.

Finally, the dotted line shows swarms that are restricted in both of the ways described above: information use is disabled, and parameters are fixed to those evolved for swarms of size 6. By comparing the dash-dotted line to the dotted line, shows how the GA evolves the remaining parameters that govern robot movement ($p_r$, $p_s$, and ω) in order to adapt to swarm size. The GA is able to adapt movement to scale up more efficiently: adapting movement parameters to a swarm size of 24 improves swarm efficiency by 6.8%, and adapting movement parameters to a swarm size of 768 improves swarm efficiency by 59%. Thus, parameters governing movement improve efficiency more than parameters governing information use (59% vs. 46%, respectively, for swarms of 768).

The scaling exponents are remarkably similar for swarms under the 4 conditions shown in FIG. 11 (slopes ranging from -0.14 to -0.21): those that adapt to swarm size, those with behaviors adapted only to a swarm of 6 robots, those that do not use individual memory or pheromone communication, and those with behaviors adapted to a swarm of 6 robots that do not use memory or communication. The cause of these similar exponents is unclear. Central-place foraging produces diminishing returns as swarm size increases because the central nest imposes a constraint on swarm efficiency—robots in larger swarms have to travel farther to collect more resources.

FIGS. 12a and 12b show two ways in which the GA evolves different strategies for different swarm sizes. Both parameters are drawn from the single best strategy evolved for each swarm size. FIG. 12a shows that the variation in the uninformed random walk (ω) declines with swarm size. Other movement parameters are also correlated with swarm size: robots in larger swarms use the straight motion of the travel behavior for a longer period of time (i.e. $p_s$ decreases; see FIG. 13a in supplementary material), and they are less likely to give up searching and return to the nest (i.e. $p_r$ decreases; see FIG. 13b), supplementary material). These three trends result in robots in large swarms using more directed motion to disperse farther to cover a larger area and reduce crowding.

FIG. 12b shows how the GA evolves the probability of laying pheromone for different swarm sizes. The probability of laying pheromone decreases with swarm size when two resources are found in the local neighborhood of a found resource (Eq. 4: k←2, λ←$_{l\ p}$ This decreasing trend is observed for all numbers of neighboring resources (this follows from Eq. 4). Additionally, pheromone waypoints decay faster as swarm size increases ($\lambda_{pd}$) (FIG. 13(d), supplementary material). Small swarms may evolve to lay pheromones more often because they deplete piles more slowly than larger swarms. The preference for less pheromone laying and faster pheromone decay in larger swarms may be advantageous to avoid the problem of overshoot in real ant foraging, where pheromones can adversely affect foraging rates by recruiting ants to previously depleted food sources.

The two remaining parameters evolved by the GA, the rate of site fidelity ($\lambda_{s\ f}$) and the decay rate of the informed random walk ($\lambda_{id}$), show no significant correlation with swarm size.

The central-place foraging algorithm (CPFA), whose parameters are evolved by a genetic algorithm (GA), may be used to maximize foraging performance under different experimental conditions. Experiments show that the system successfully evolves parameters appropriate to a wide variety of conditions in simulation, and these lead to successful foraging in robots. Strategies that automatically tune memory and communication substantially increase performance: FIG. 8a shows that the more complex strategy doubles foraging efficiency for clustered resources compared to a simpler strategy evolved for randomly distributed resources. The same behaviors that allow flexible foraging for different resource distributions can also adapt to tolerate real-world sensing and navigation error (FIG. 6) and scale up to large swarm sizes (FIG. 11). The foraging system of the invention solves key challenges in swarm robotics since it automatically selects individual behaviors that result in desired collective swarm foraging performance under a variety of conditions.

The error tolerance, flexibility, and scalability of the system arise from interactions among the set of behaviors specified in the CPFA, and dependencies between those behaviors and features of the environment. These interactions allow a small set of 7 parameters (Table 1) to generate a rich diversity of foraging strategies, each tuned to a particular amount of sensing and navigation error, a particular type of resource distribution, and a particular swarm size. Post-hoc analysis of evolved parameters reveals that pheromone-like communication is one among many important components of the evolved strategies, and interactions among multiple behaviors (i.e., memory, environmental sensing, and movement patterns) are important for generating flexible strategies. Further, the relative importance of pheromone communication varies with sensing and navigation error, resource distribution, and swarm size.

Several examples illustrate how the parameters are automatically adapted by the present invention to features of specific foraging problems. The power-law-distributed resources are placed in a range of pile sizes, so effective strategies balance the use of random exploration to find scattered resources, individual memory to collect resources from small piles, and recruitment to collect resources from large piles. This balance is altered when the simulations include real-world sensing and navigation error. When error is included, the power law strategy uses less pheromone laying and less site fidelity (FIG. 9(a,b). vs. FIG. 9(c,d), light gray bars); thus, search automatically becomes more random when information is less reliable due to error. In contrast, the cluster-adapted strategy uses more pheromone communication when robots have error: pheromones are laid more often and evaporate more slowly (FIG. 7), and robots reduce rates of site fidelity in order to follow pheromones more (FIG. 9(a) vs. FIG. 9(c), white bars). Sensing and navigation errors have the least effect on foraging performance when resources are distributed at random (FIG. 5), and random-adapted strategies are unaffected by error (FIG. 9, dark gray bars) because those strategies do not evolve to use information.

Thus, introducing more complex resource distributions reveals effects of sensing and navigation error that are not apparent in simpler foraging problems. Understanding how error affects foraging for heterogeneously distributed resources, and having an automated way to adapt to those effects, are both important given that landscapes in the real world have complex resource distributions, and that robots in the real world have error. Additionally, real-world scenarios will have variable numbers of robots to achieve different tasks. We demonstrate that systematic changes in behaviors are adaptive in larger swarms. To overcome these problems, it has been found that power-law-adapted robots in larger swarms evolve to disperse more (FIG. 12(a)) and communicate less (FIG. 12(b)), and that parameters governing movement have a greater effect on scaling performance than parameters governing communication (59% vs. 46% improvement). Thus, the same parameters that adapt to improve performance for different distributions and error cases can also be automatically tuned to improve performance for variable swarm sizes.

In other embodiments, the GA is focused on identifying combinations of parameters governing individual behaviors that maximize collective performance. This mirrors the natural evolutionary process that has shaped the successful foraging strategies of different ant species by tuning and combining a common set of existing behaviors. The results show significant performance improvements when parameters are evaluated in the same context in which they are evolved. The success of the evolved foraging strategies demonstrates that this approach is a practical method to generate effective foraging strategies from interactions among foraging behaviors and the specified foraging environment.

The GA automatically selects individual behaviors that result in desired collective swarm foraging performance under a variety of conditions. It is the interactions with features of the specified foraging problem during the evolutionary process that generate complex and flexible behaviors. Foraging strategies emerge from the interactions among rules and dependencies in the foraging environment, including the amount of error in robot sensing and navigation, the complexity of the resource distribution, and the size of the swarm.

Figure 13:
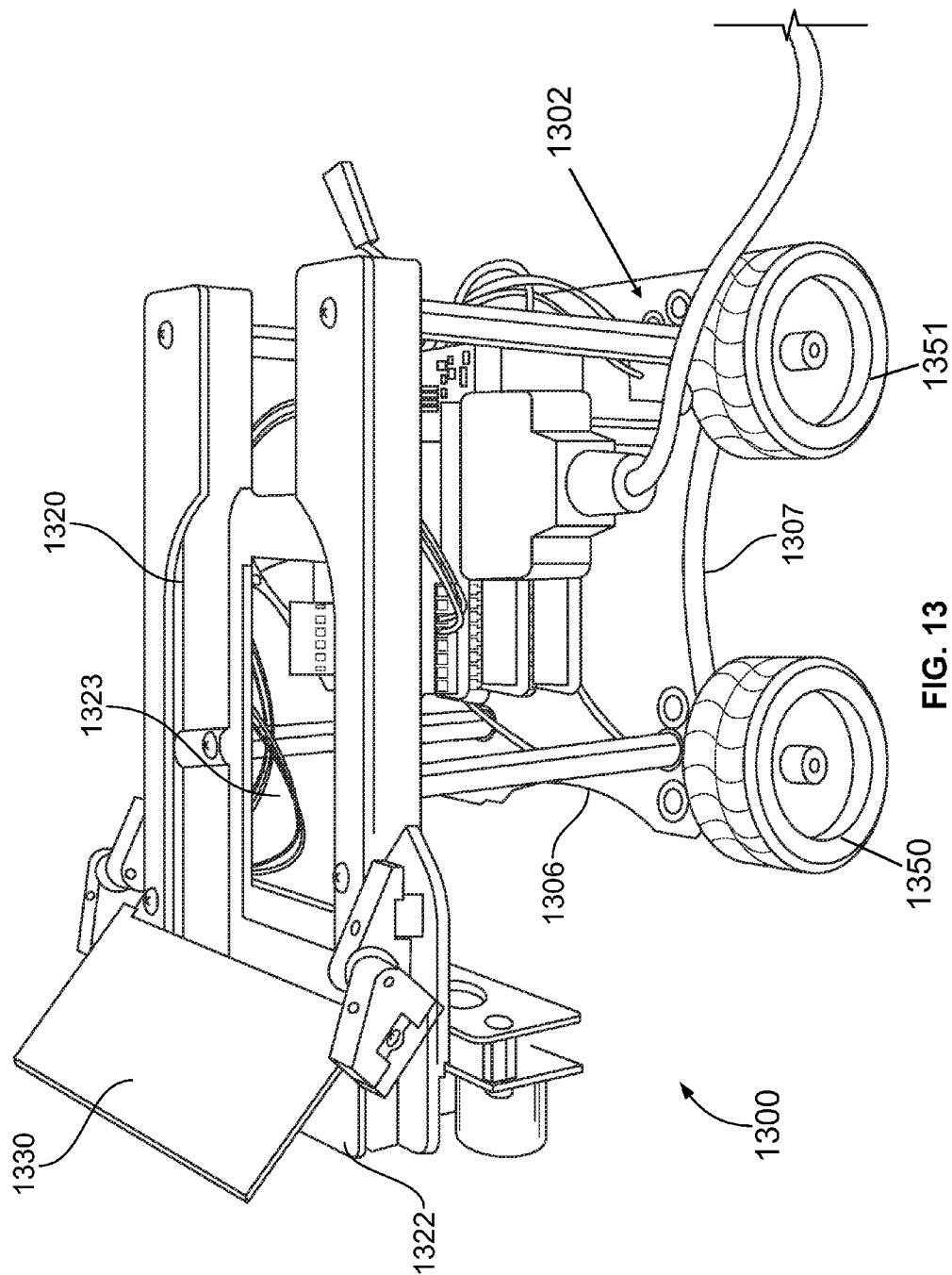
FIG. 13 shows a perspective view of an embodiment of the present invention.
Figure 14:
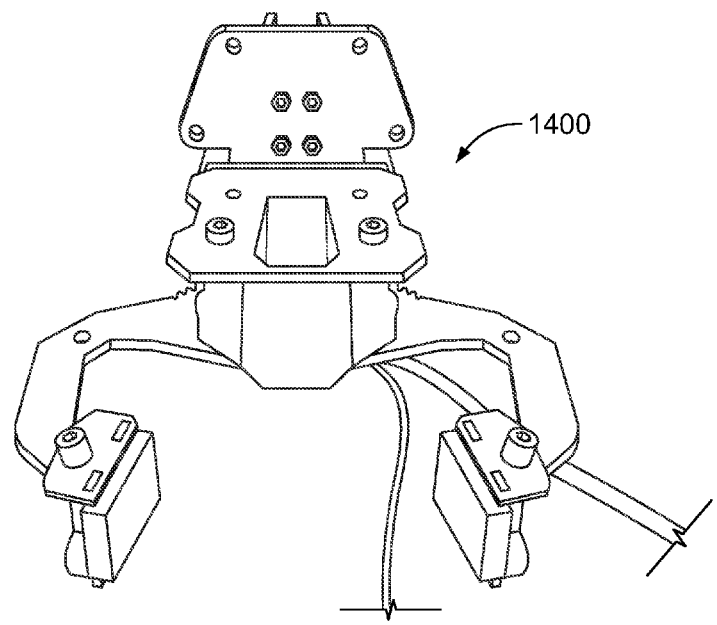
FIG. 14 shows a perspective view of a gripper mechanism that may be used with an embodiment of the present invention.
Figure 15:
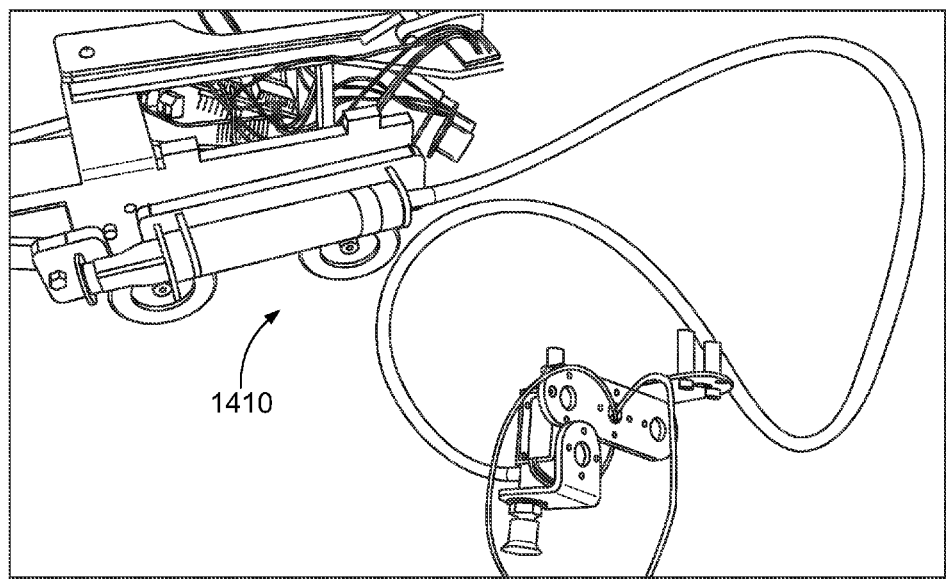
FIG. 15 shows a perspective view of a suction cup arrangement that may be used with an embodiment of the present invention.

FIGS. 13-15 illustrate another exemplary robot 1300 that may be used with the present invention. A platform 1302 is provided and includes indents 1306 and 1307 that may also be located on all sides of the platform or chassis to provide open areas. The open areas assist in preventing the tires of the robots from entanglement. For example, indent 1307 provides additional space for s tire (not shown) from be entangled between tires 1350 and 1351. Indent 1306 also prevents obstruction of the camera 1310 which may be incorporated into a processor. The camera is located in slot 1320 with upper member 1322 being clear in nature so as to allow viewing of a display associated with the camera. A camera access area 1323 may also be provided.

The camera may be downward facing to view the area immediately in front of the device for resource location. The camera may also be upward facing to provide a forward looking view via angled mirror 1330. The angle of mirror 1330 may be adjustable to allow for changing the angle of the forward looking view.

A microcontroller is provided to coordinate operation of the drive motors and to process on-board sensor input. Sensors include a magnetometer and ultrasonic rangefinder, as well as one or more cameras as described above to provide forward-facing and downward-facing information. The forward-facing camera is used to detect a central nest beacon, and the downward-facing camera is used to detect resources. In addition, resource specific sensors may also be provided that include chemical and gas specific sensors and other sensors known to those of skill in the art.

Lastly, to retrieve one or more resources articulating jaws 1400 may be provided. In addition, the system may also use articulating suction cup system 1410.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method of operating a plurality of robots to perform foraging for a resource, comprising the steps of:
   programming each robot to know where the nest is and with an inherent leash;
   a. each robot is programmed to conduct a uniformed search by traveling to a random first location along a substantially straight path;
   b. upon reaching said first location, each of said robots performing a uniformed correlated random walk for a first predetermined time period set by each robot independently of each other for random length of times;
   c. if during said first predetermined time period no resource is found, said robot returns to the nest;
   d. upon returning to the nest, each robot repeats steps a-c until a resource is found by at least one robot;
   e. upon finding a resource, the robot finding the resource collects one or more resources, independently assigns a resource grade to the location, returns to the nest and depending on the resource grade 1) repeats steps a-c, 2) returns to the location without sharing the information with other robots, or 3) transmits a resource found signal informing the other robots of the resource location, said signal based on said resource grade; and f. upon receiving a resource found signal, depending on the grade of the signal, the robot receiving the signal 1) repeats steps a-c, or 2) travels to the location and performs step e if a resource is found and if a resource is not found, performs an informed correlated random walk.

2. The method of claim 1 wherein the signals decay over time.

3. The method of claim 1 wherein said informed correlated random walk decays into a uniformed correlated random walk over time.

4. The method of claim 1 wherein the steps a-e are optimized by a genetic algorithm for unique environments.

5. The method of claim 1 where said resource grade is a function of the environments in which the robots are operating.

6. A method of operating a plurality of robots to perform foraging for a resource, comprising the steps of:
   a. programming each of said robots to start at a nest and to select a dispersal direction from a uniform random distribution, said robots travel along said dispersal direction until transitioning to a search mode upon reaching said search site;
   b. said search mode comprises a correlated random walk with fixed step size and direction and using a standard deviation to determine how correlated the direction of the next step of the robot is with the direction of the previous step; and
   c. returning to said nest if a resource is not found within a predetermined time t.

7. The method of claim 6 further including the step of repeating steps a through c until at least one resource is found by one of said plurality of said robots.

8. The method of claim 7 wherein each robot performs the step of determining time t.

9. The method of claim 8 wherein when a robot locates a resource, said robot performs the steps of collecting the resource, recording a count c of resources found and returning to said nest.

10. The method of claim 9 wherein for a robot that has located a resource, upon returning to said nest, said robot uses c to decide whether to i) return to the location of the resource ii) generate a resource location communication for use by other robots iii) follow a resource location communication generated by another robot or iv) perform steps a and b.

11. The method of claim 10 wherein for a robot that is conducting a search based on receiving a resource location communication, said robot searches using an informed correlated random walk, where the standard deviation of the successive turning angles of the informed random walk decays as a function of time t randomly determined by said robot, producing an initially undirected and localized search that becomes more correlated over time.

12. The method of claim 11 wherein said standard deviation σ is defined by $$\sigma = \omega + (4\pi - \omega)e^{-\lambda_{id}t}.$$

13. The method of claim 6 wherein said search mode comprises a correlated random walk with fixed step size and direction $\theta_t$ at time t, defined by $\theta_t = N(\theta_{t-1}, \sigma)$ and using a standard deviation σ to determine how correlated the direction of the next step of the robot is with the direction of the previous step.

14. The method of claim 10 wherein the robot returns to a previously found resource location if c exceeds a uniform random value and, if c is less than the uniform random value, the robot follows a resource location communication of another robot to another location if a resource location communication is available and if no resource location communication is available, the robot will choose its next search location at random.

15. The method of claim 10 wherein the robot transmits a resource location communication to a list maintained by a server and the server selects a resource location communication from the list and transmits it to one or more robots.

16. The method of claim 15 wherein the strength of a resource location communication decays over time.

17. The method of claim 16 wherein the strength of a resource location communication decays exponentially over time.

18. A method of operating a plurality of robots to perform foraging for a resource, comprising the steps of:
   a. programming each of said robots to start at a nest and to select a dispersal direction from a uniform random distribution, said robots travel along said dispersal direction until transitioning to a search mode upon reaching a search site;
   b. said search mode comprises a correlated random walk with fixed step size and direction and using a standard deviation to determine how correlated the direction of the next step of the robot is with the direction of the previous step;
   c. a robot returns to said nest if a resource is not found within a predetermined time t independently determined by the robot;
   d. repeating steps a through c until at least one resource is found by one of said plurality of said robots;
   f. when a robot locates a resource, said robot locating the resource performs the steps of collecting the resource, recording a count c of resources found, returning to said nest, and upon returning to said nest, said robot generates a resource location communication and then returns to the resource location if c exceeds a uniform random value and, if c is less than the uniform random value, the robot follows a resource location communication to another location if a resource location communication is available and if no resource location communication is available, the robot will choose its next search location at random; and
   g. for a robot that is conducting a search based on receiving a resource location communication, said robot searches the resource location using an informed correlated random walk, where the standard deviation of the successive turning angles of the informed random walk decays as a function of time t randomly determined by said robot, producing an initially undirected and localized search that becomes more correlated over time.

19. The method of claim 18 wherein a robot transmits a resource location communication to a server and said server selects a resource location from the list and transmits it to one or more robots.

20. The method of claim 18 where the steps are optimized by a genetic algorithm.

* * * * *